United States Patent [19]

Roggendorf

[11] Patent Number: 4,703,311
[45] Date of Patent: Oct. 27, 1987

[54] METHOD AND APPARATUS FOR TRANSFERRING AN INFORMATION CODE ONTO THE SYNCHRONIZATION TRACK OF A VIDEO TAPE AND A VIDEO TAPE PRODUCED ACCORDING TO SAID METHOD

[75] Inventor: Peter Roggendorf, Mainz-Kostheim, Fed. Rep. of Germany

[73] Assignee: GSE Electronic Systems, Inc., Salt Lake City, Utah

[21] Appl. No.: 3,932

[22] Filed: Jan. 16, 1987

[30] Foreign Application Priority Data

Jun. 9, 1986 [DE] Fed. Rep. of Germany ....... 3619359

[51] Int. Cl.$^4$ ...................... H03K 13/24; G11B 27/02
[52] U.S. Cl. ............................ 340/347 DD; 360/14.2; 360/321; 360/72.2
[58] Field of Search ............... 340/347 DD; 360/14.2, 360/13, 143, 18, 37.1, 40, 72.1, 72.2, 74.4, 134; 358/148, 150, 153

[56] References Cited

U.S. PATENT DOCUMENTS

| | | | |
|---|---|---|---|
| 4,100,575 | 7/1978 | Morio et al. | 358/120 |
| 4,112,445 | 9/1978 | Steinkopf et al. | 360/37.1 |
| 4,134,130 | 1/1979 | Tachi | 360/14.3 |
| 4,167,028 | 9/1979 | Tebey | 360/72.2 |
| 4,167,759 | 9/1979 | Tachi | 360/14.3 |
| 4,549,231 | 10/1985 | Namiki | 360/14.2 |
| 4,616,270 | 10/1986 | Nishimoto | 360/37.1 |

FOREIGN PATENT DOCUMENTS 3309029 9/1984 Fed. Rep. of Germany .

Primary Examiner—Vit W. Miska
Attorney, Agent, or Firm—Peter K. Kontler

[57] ABSTRACT

A method for transferring an information code onto the synchronization track of a video tape is described. The code is recorded during intervals between synch pulses by adding code pulses of the same magnetization as the recorded synch pulses on the synchronization track. The code pulses, at least in part, overlap the synch pulse with the length of the code pulses representing binary values. With this technique, an erasure of pre-recorded synch pulses is not required. A recording device is used that contains a generator of code pulses and at least two timing elements which are set when a synch signal in response to a detected synch pulse is produced. One of timing elements operates a mode changeover switch and the other activates the code pulse generator. A reading device is used and contains two threshold detectors which detect two synch signals, representative of the beginning and ending of recorded synch signals. In response at least one timing element is started at the beginning of the synch signal. A code evaluation circuit is used to determine if the end of the synch signal appeared during the running period of the latter timing element or after it. A pre-recorded video tape is described to carry twice-magnetized sections on its synchronization track of at most about the length of the synch pulse recording and, following that, once-magnetized sections of either of two different lengths, both preferably being shorter than the synch pulse recording itself.

22 Claims, 5 Drawing Figures

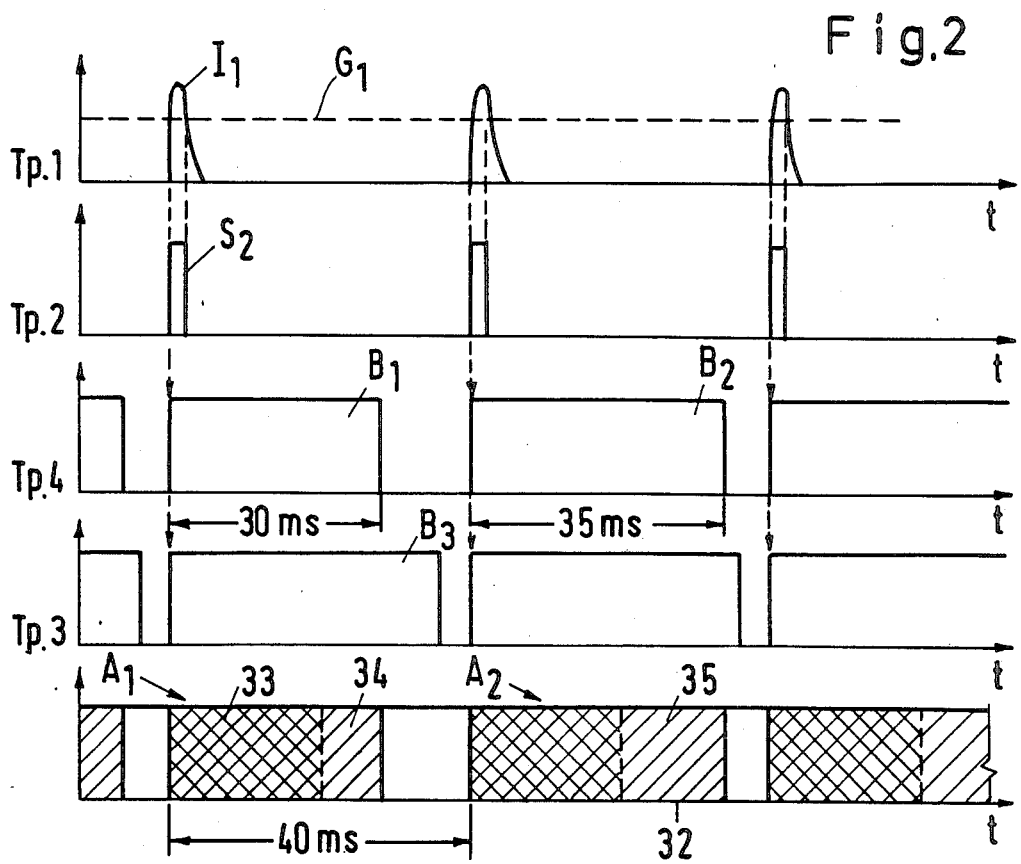
Fig. 2
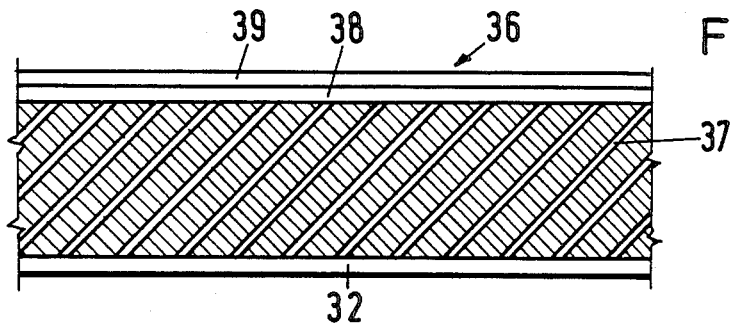
Fig. 4
Fig. 5
| Codeword 50 bit | | | | | | | | | |
|---|---|---|---|---|---|---|---|---|---|
| S | D | | | | | | | | E |
| | 1 Std. | 10 min. | 1 min. | 10 sec. | 1 sec. | Ident 10 | Ident 1 | User 10 | User 1 | |
| 8 bit | 4 bit | 4 bit | 4 bit | 4 bit | 4 bit | 4 bit | 4 bit | 4 bit | 4 bit | 6 bit |
| 1.-8. | 9.-12 | 13.-16 | 17.-20 | 21.-24 | 25.-28 | 29.-32 | 33.-36 | 37.-40 | 41.-44 | 45.-50. |
— 2 sec —

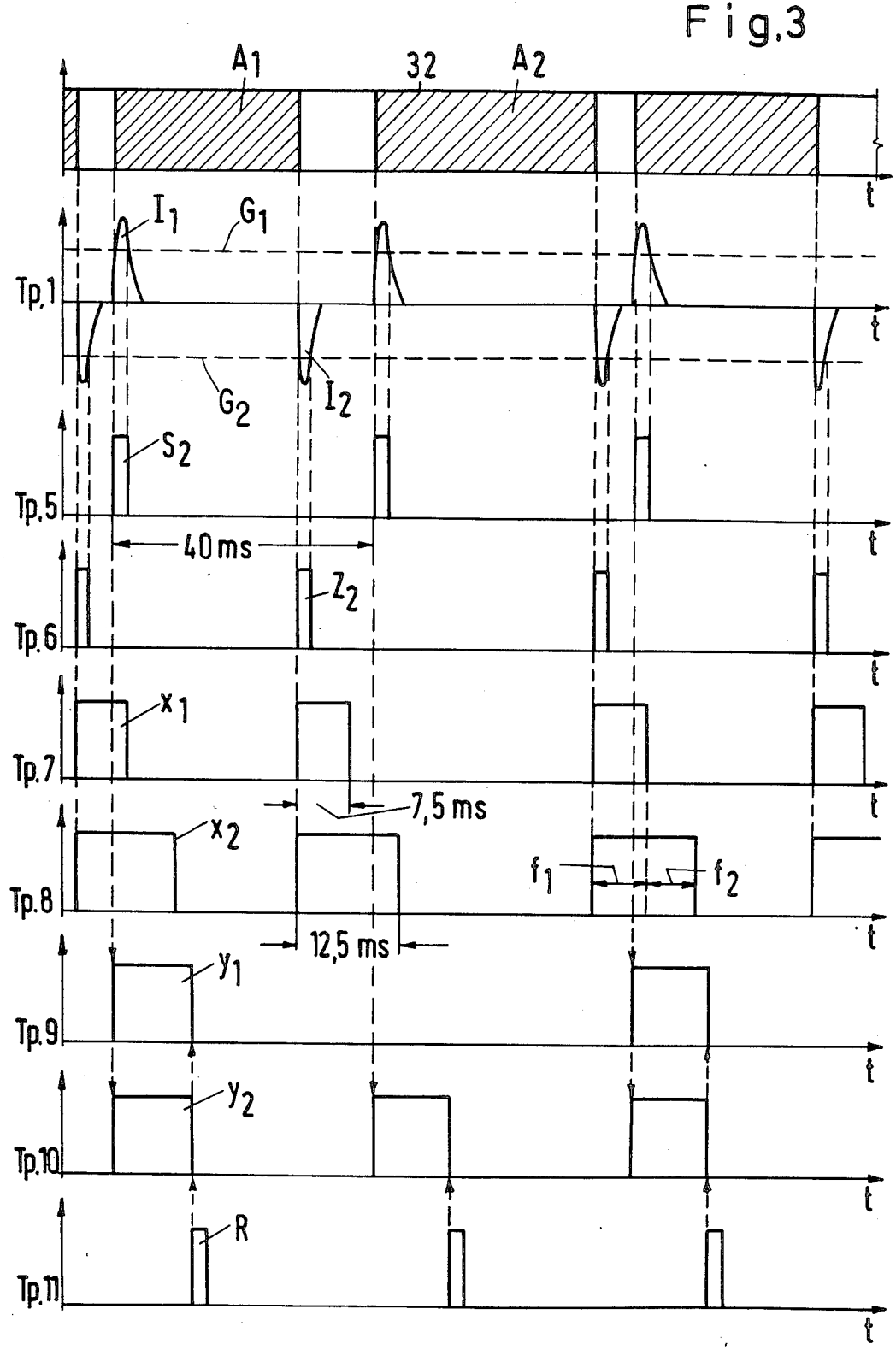

METHOD AND APPARATUS FOR TRANSFERRING AN INFORMATION CODE ONTO THE SYNCHRONIZATION TRACK OF A VIDEO TAPE AND A VIDEO TAPE PRODUCED ACCORDING TO SAID METHOD

FIELD OF THE INVENTION

This invention relates to a method and apparatus for transferring an information code onto the synchronization track of a video tape employing prerecorded synchronization pulses, and to a video tape produced according to said method.

BACKGROUND OF THE INVENTION

In a method that is already known from German Patent Publication DE-PS No. 33 09 029, a time code is recorded on the synchronization track of a video tape in such a way that, at a given time, a preset number of synchronization (synch) pulses is combined to form a data block assigned to a certain section of the tape. The synch pulses of each of the data blocks are coded and recorded with an information content for a specific tape section in such a way that, during replay of the tape, the synch pulses may be retrieved from the coded data blocks. The synch pulse may, for instance be coded by means of pulse-polarity modulation, by width-modulation, or by frequency modulation. In either one of such procedures, any pulses that already were pre-recorded on the synchronization track will be replaced by the recording of a coded pulse. This means that, in the case of a later coding, those synch pulses that were already pre-recorded at an earlier time will have to be first erased. Such erasure, when limited to the synchronization track, represents a complex procedure and involves the hazard of affecting any video signal that was already recorded on the tape.

SUMMARY OF THE INVENTION

The present invention permits the subsequent coding on the synchronization track of a pre-recorded video tape without requiring an erasure of earlier recorded synch pulses on that track.

In according with one technique of the present invention such coding is obtained by the recording of pulse width modulations on the synchronization track between successive synch pulses with magnetically recorded code pulses that are longer than the synch pulses. Such subsequent recording is effected by means of additional code pulses whose direction of magnetization is the same as the synch pulses so that their respective magnetizations are additive. Since the code pulses magnetize the synchronization track in the same fashion as the synch pulses, the code pulses may at least in part overlap the existing synch pulses.

The additional code pulses extend the synch pulse recordings in accordance with desired binary values. An overlap is advantageous in order to obtain a continuous recording of each code pulse. The fact that, in this process, the track of the synch pulse recording will be magnetized for a second time, does not harm any subsequent track reading process. This is because the first magnetic recording of the synch pulses already reached a degree of saturation or came close to it, so that subsequent magnetizing in the same direction will not lead to a significant change of state.

Since an erasure is not required, the method of recording code pulses may be effected without any problems. There also will be no risk of affecting any pre-recorded video signals. Another benefit is seen in the fact that such subsequently coded video tapes may be replayed on conventional video recorders (albeit without evaluation of the coded information), because one of the ends of the synch pulse recording, i.e, preferably the front end, may continue to be used for obtaining a synchronization signal.

As described in a preferred embodiment the beginning of the magnetic synch pulse is detected and the additional code pulse is recorded in response to the moment of this detection. The recording of the code pulse is terminated after a first or second binary value determining delay time.

These two delay times may be sufficiently different from each other. At normal tape speed, a new synch pulse will occur or commence at regular intervals every 40 ms. (PAL) or 33.3 ms (for NTSC) and will last for about 20 ms. or 16.7 ms respectivly Under these conditions, an extension of the synch pulse recording periods from about 10 ms. or 15 ms., respectively, will suffice to properly identify the binary value represented by the code pulse.

In a read mode, it is advantageous that a synch signal is obtained from the start or initial signal that appears at the magnetic head, namely, the signal occurring at the beginning of the magnetic pulse recording of the synch pulse, and that the end of the magnetic pulse during the interval bounded by this synch pulse recording is detected by sensing an opposite polarity output from the magnetic head. This end detection represents the code signal. The time difference between the detection of the synch signal and the code signal is used to determine the bit value represented by the code signal. The determination of different binary bit values may be achieved in an uncomplicated way from the relationship between the synch signals and the code signals.

In this context it is of particular advantage to evaluate the time difference between the code signal and the next successively occurring synch signal, i.e. the synch signal occurring at the end of the interval. This time difference is shorter than the time difference between the preceding synch signal and the end of the code signal following thereafter, thus allowing an easier and more accurate binary bit evaluation.

It is also advantageous and an aspect of the invention that the detection of a code signal initiates first the generation of two different time window pulses and then a determination of whether and in which one of these time windows pulses the next successive synch pulse occurs. The time window pulses are time limited in both directions so as to offer the benefit that any pulses occurring outside these windows will remain unnoticed.

One apparatus for carrying out a method in accordance with this invention uses a read-write magnetic head and a read-write mode changeover switch. The device comprises a threshold detector for the detection of the beginning of the synch pulse recording and the subsequent generation of a synch signal indicative thereof. A generator is used to produce a code pulse for recording in response to a synch signal. Two timing elements are activated by the detected pulse synch. One of the time elements temporarily sets the changeover switch from a read mode to a write mode, and the other element cuts off the code pulse to be recorded upon expiration of either one of two delay periods.

The apparatus as described above is used for recording code pulses on the synchronization track of a video magnetic tape on which track synch pulses already exist. Although pre-recorded synch pulses are used to synchronously trigger the timing elements, the synch pulses remain unaffected on the synchronization track. When the code pulse information is then recorded, the changeover switch is operated in such manner as to ensure that the additional magnetization for the additional code pulses can take place.

In a preferred form of execution of such apparatus, the generator for the additional code pulses is provided with an electronic switch to connect a voltage to the magnetic head while one of the timing elements during its delay period causes a closure of the switch in response to the detected synch signal and opens it again at the end of the delay period. This arrangement constitutes a convenient way to carry the additional code pulses to the magnetic head.

A further advantage is seen in the presence of a second switch connecting the magnetic head supply line, alternatively with respect to the first switch, to ground. In this way a distinct demarcation of the magnetically recorded coded pulses is achieved.

A preferred version of the read-write mode changeover switch is in an electronic form that is triggered by means of a control pulse or voltage generated by a first timing element. It is further recommended that the mode changeover switch be integrated into the assembly containing the read-write magnetic head, an amplifier and a threshold detector used to detect the synch signal. Because of its electronic actuation, the mode switch is capable of handling the required rapid changeover operations.

One apparatus for practicing the method of the invention also has two threshold detectors which are used for the separate detection of the beginning and end of the recorded magnetic pulses and for the generation of synch signals and code signals. At least one timing element is used at the occurrence of these signals with a code evaluation circuit to determine whether the other signal is present during or after the running period of the timing element.

Such latter apparatus is used to read the binary values of the recorded coded pulses. The synch signals, originally intended to control synchronization, are used to trigger the timing element. By combining the time-sequenced appearance of the synch signal and the code signal, specific binary values may be determined.

It is particularly advantageous to use, during the read mode, two timing elements, each with a different running time and which are activated at the rise of one signal detected from the synch track. The code evaluation circuit then determines whether the other signal is present during the running time of one or both timing elements. In this way, two adjacent time windows are obtained, one of which is formed by the output pulse or running period of one timing element and the other time window is defined by the difference of the running periods or output pulses of both timing elements.

For a specific embodiment described herein, it is recommended that each timing element used in the read circuit is made from a monoflop and that the code evaluation circuit comprises two JK-flip-flops, either one being prepared through the output signal of one monoflop and being set by means of the output signal from a threshold detector for a synch track detected signal. In addition, a logic circuit is used to poll the flip-flop outputs. Such monoflops and flip-flops may be easily manufactured in the form of integrated circuits. A microprocessor, for example, may be used for the logic circuit.

It is particularly advantageous to vary the running period (output pulse) of at least one timing element that is assigned to the code evaluation circuit so that smaller or larger values can be set electronically. This feature will allow a higher tape speed to reduce the reading time of the information and/or to obtain a controlled and faster access to a certain section of the video tape.

Another advantage is achieved with a common theshold detector that sends a synch signal not only to the timing element controlling the additional pulse generator, but also to at least one of the timing elements that are assigned to the code evaluation circuit. Once recording equipment also contains a reading device, the use of a common threshold detector offers a cost-saving benefit.

A pre-recorded video tape in accordance with the invention is characterized in that its synchronization track has, for the purpose of recording coded pulses, been provided with twice-magnetized sections each at most of about the length of the synch pulse recordings and followed by once-magnetized sections of either of two different lengths. These lengths could be shorter than the recorded synch pulses. Such video tape may be pre-recorded in a conventional way and subsequently be provided with a coding in accordance with the invention. Yet, in spite of such coding, it is still possible to play the tape back on a conventional video recorder.

It is also recommended that the binary values marked by the recorded length of the coded pulses form an information code data block. This includes a predetermined number of code pulses. Hence, the evaluation of the coded pulse recording will produce an information code which can contain a variety of information particularly concerning the actual tape section as well as the direction of travel of the tape.

The invention will hereafter be explained with the help of a preferred embodiment as shown in the respective drawings.

BRIEF DESCRIPTION OF THE DRAWINGS

FIG. 2 is a timing diagram of voltages at test points of the reading device.

FIG. 3 is a timing diagram of voltages at test points of the reading device.

FIG. 4 is a schematic rendition of a pre-recorded video tape, and

FIG. 5 is a schematic rendition of an example of an information code data block.

DETAILED DESCRIPTION OF DRAWINGS

Figure 1:
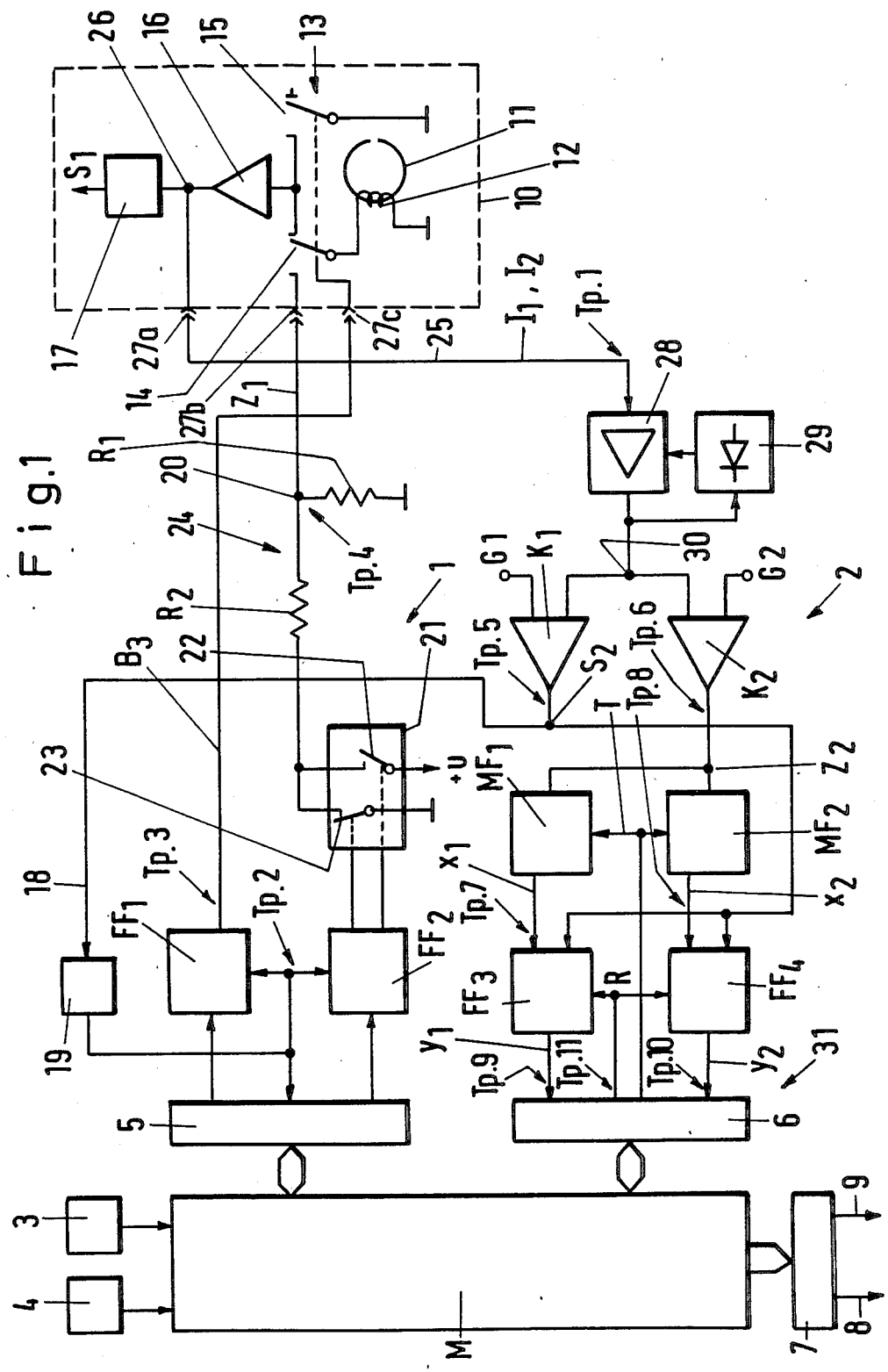
FIG. 1 is a schematic representation of a combined recording and reading device according to the invention for a video recorder.

FIG. 1 shows an aggregate recording device 1 and reading device 2, both being controlled by a microprocessor M. The microprocessor comprises, as is common, a central processing unit (CPU), a clock pulse generator, a read-only memory (ROM), a variable memory (PROM), a data bus, and address bus, and a control bus. The recording device possesses an input device 3 as, for instance, a keyboard, and an indication device 4 as, for instance, a display. The microprocessor M is connected to the recording device 1 via the interface 5 with the reading device 2 via the interface 6, and via the interface 7 with a control channel 8 leading to a video player and a control channel 9 leading to a video recorder. These control channels may be realized by means of electrical connections by infrared transmission systems or the like.

A component assembly 10 as used, for example, in a video recorder, comprises a read-write magnetic head 11 with an appurtenant coil 12, an electronically-controlled mode changeover switch 13 controlling two switch paths 14 and 15, an amplifier 16 as well as a threshold detector 17. Detector 17 produces a response when a predetermined positive threshold level is exceeded, namely, when at the beginning of a magnetic recording, a positive start signal is presented at the output of coil 12, whereupon a synchronous signal S1 to control the tape speed of the video recorder is released.

In a similar way—as will be explained later on a second synch signal S2 is obtained and coupled via line 18 through a noise blanking logical circuit 19, to interface 5 and, depending upon delay controls from microprocessor M, eventually to the outputs of two timing elements, i.e., flip-flops FF1 and FF2. The delay period for both flip-flops is preset and controlled by microprocessor M.

Flip-flop FF1 controls the changeover switch 13. When enabled, the changeover switch will go from the read mode position shown here in FIG. 1, in which the coil 12 is connected to the amplifier 16, to the other position for a write mode. In the write mode the input to amplifier 16 is connected to ground potential and coil 12 is connected to a junction 20 in a voltage divider consisting of resistors R1 and R2. The voltage divider forms, together with a switching device 21 containing two switches 22 and 23, a generator 24 for additional code pulses Z1 which are made available at junction 20 for recording by magnetic head 11.

Reading device 2 is connected, via line 25, to output 26 of amplifier 16. Thus, only three connections, namely 27a, 27b and 27c, are needed to connect the combined read-write device 1, 2 with the assembly 10 inside the video recorder. Line 25 carries start signals I1 and end signals I2 both being induced in coil 12 but respectively at the beginning and the end of a magnetic recording. These signals are amplified by an amplifier 28 that is controlled by a controller 29 and are coupled to the inputs of two threshold detectors K1 and K2. The other inputs of these detectors are each supplied with a limit or reference level G1 and G2, respectively.

Once the signal at the amplifier output 30 falls below the limit value G2, i.e., when the end signal I2 appears, the threshold detector K2 releases or generates a code signal Z2 which is coupled to the inputs of two single pulse generators or monoflops MF1 and MF2. These two monoflops differ in their running periods in the course of which they will send preparation or set pulses X1 and X2, respectively, to the preparation or set inputs of the JK-flip-flops FF3 and FF4, respectively. The outputs of monoflops FF3 and FF4 are signals Y1 and Y2 that occur in a manner so as to enable code evaluation by microprocessor M. Microprocessor M also sends an appropriate reset signal R to the flip-flops FF3 and FF4 and also a fast-run signal T to reduce or vary the running times of the monoflops MF1 and MF2. Together the flip-flops and the microprocessor form a code evaluation circuit 31.

With reference to FIG. 2 the operational principle of the device for recording an information code can be explained in detail. The induced start or synch signals I1 appear at the test point Tp1. From these signals, the threshold detector K1 generates synch signals S2. Under normal tape speed these signals are sequenced at a distance equivalent to a time separation interval of 40 ms. between each other. The leading edge of the synch signal triggers the flip-flops FF1 and FF2.

The second flip-flop FF2 is controlled by microprocessor M in such way that FF2 causes a connection of the voltage divider R1, R2 to the voltage +U for a short or long period of time, in this case for 30 or 35 ms., depending on the desired binary value for the code pulse to be recorded on the tape. This will produce voltage pulses B1 and B2, respectively, at the test point Tp4, namely at the junction 20. Flip-flop FF1 generates voltage pulses B3 which cause the changeover switch 13 to be switched into a write-mode condition. Such switching operation occurs as soon as the induced start or synch signal I1 has been read or detected. The write mode as represented by pulse 33 will remain enabled for a somewhat longer period than the period of the voltage pulse B2; however coil 12 can in any event be connected to ground by switch 23 at the end of pulse B3.

Resulting from the above are the recordings A1 and A2 found in the synchronization track 32 shown at the bottom of FIG. 2. In the area of the pre-recorded original synch pulse 33, a second magnetization will occur. Said twice-magnetized section is followed by a shorter section 34 or a longer section 35, both with single magnetization. The magnetization in all sections 33 and 35 has reached saturation or comes close to it. The entire recordings A1 and A2 differ in length from each other and mark the coded pulses B1 and B2.

In the process of reading the recordings A1 and A2 shown once again at the top line of FIG. 3, the induced start signals I1 as well as the induced end signals I2 will appear at the test point Tp1, since the mode changeover switch 13 is not operated in dependence on the start signals I1 but in dependence upon the operation of FF2 that is controlled by processor M. In response to the signals appearing on line 25 at test point Tp1 the threshold detector K1 generates the synch signals S2 (at test point Tp5), and the threshold detector K2 generates the code signals Z2 (at test point Tp6).

The monoflops (monopulsers) MF1 and MF2 are triggered by code signals Z2 to generate output signals X1 and X2 respectively and which have durations for periods of, say 7.5 ms. and 12.5 ms., respectively (test point Tp7 and Tp8). Signals X1 and X1 are applied to JK-flip-flops FF3 and FF4 which are thus prepared to release output signals Y1 and Y2, respectively (test points Tp9 and Tp10), once synch signal S2 appears. These latter output signals are terminated by means of the reset signal R (test point Tp11) from processor M.

If the synch signal S2 arises a short time, equivalent to a small spatial tape distance, after the code signal Z2, the output signals Y1 and Y2 will both appear. If, on the other hand, the synch signal S2 occurs at a later time, equivalent to a larger tape distance, from code signal Z2, only the output signal Y2 will appear. In this manner the microprocessor M will be able to recognize the binary value represented by the specific combination of pulses Y1 and Y2.

This technique of binary value detection in effect produces two windows f1 and f2 during which the binary value is determined. If the threshold detector K2 should respond to a negative pulse outside these windows, such response and pulse is ignored.

FIG. 4 shows a video tape 36 containing helical-scan tracks 37, the synchronization track 32 and the audio-frequency tracks 38 and 39, all of this in conventional fashion.

The synchronization track 32, for example, may also contain an information code of the kind shown schematically in FIG. 5.

Assigned to each frame (or field) is a recording A1 or A2 from which a synch signal may be obtained and which also possesses a binary value. One information code consists of 50 bits or the time equivalent of 2 seconds in case of full frames. The data block comprises a start section S with 8 bits and an end section with 6 bits, both sections permitting the running direction of the tape to be detected. Between said sections there is a data field D containing hour units, minute tens, minute units, second tens, second units, a two-position identification code and a two-position identification code and a two-position user code. By changing the identification code, it is possible to assign a different meaning to the preceding data. The user code, for example, may be used to show the cassette number, the duplicating or re-recording firm or similar information. By virtue of the time information contained in the data block between the sections, it is possible to precisely define a certain position on the video tape and gain fast access to it. The data block may also contain information of a different kind such as a directory connected in series upstream of the time code, or control instructions, key data and the like.

What is claimed is:

1. A method for applying an information code onto a video recording synchronization track employing synch pulses recorded on said track at regular intervals, comprising the step of:

recording code pulses on the synchronization track without prior erasure of synch pulses, wherein the code pulses are longer than the synch pulses but shorter than the intervals between successive synch pulses and wherein the durations of the code pulses represent binary values.

2. The method as claimed in claim 1 wherein the code pulses and synch pulses are recorded magnetically onto a video magnetic tape, with the direction of magnetization of recorded code and synch pulses being the same.

3. The method as claimed in claim 2 wherein the code pulse at least partially overlaps a previously recorded synch pulse.

4. The method as claimed in claim 2 wherein the step of recording code pulses includes the steps of:

detecting the synch pulses, and in response to said detected synch pulses, recording said code pulses on the synchronization track during said intervals.

5. The method as claimed in claim 4 wherein the step of detecting synch pulses detects the beginning of the magnetic recording thereof; and wherein said code pulses are recorded in response to said detected beginnings of the synch pulses.

6. The method as claimed in claim 5 and further including the step of detecting the beginning of the magnetic recording of each synch pulse;

detecting the ending of the magnetic recording of the code pulse recorded during the interval bounded by the synch pulse for which a beginning was detected; and evaluating the time difference between the beginning of the synch pulse and the ending of the code pulse to determine the binary value of the code pulse.

7. The method as claimed in claim 6 wherein the synch pulses that are used to evaluate said time differences occur at the end of said intervals.

8. The method as claimed in claim 7 wherein said evaluating step comprises the steps of:

generating, in response to the detected ending of the code pulse, first and second time window signals in response to said detected ending of the magnetic recording of the code pulse; and determining during which time window the synch pulses at the end of said intervals occur to derive the binary value of the code pulse.

9. An apparatus for applying an information code onto a video recording synchronization track employing synch pulses recorded on said track at regular intervals comprising:

means for detecting the synch pulses and producing start signals indicative thereof;

means responsive to the start signals for generating code pulses whose durations are longer than the synch pulses and shorter than the intervals and are representative of binary values; and means for recording said code pulses on said synchronization track during said intervals without prior erasure of said synch pulses.

10. The apparatus as claimed in claim 9 wherein the synchronization track is on a video magnetic tape and wherein said recording means magnetically records said code pulses with the direction of magnetization of the recorded code pulses and synch pulses being the same.

11. The apparatus as claimed in claim 10 wherein the synch pulse detecting means detects the beginning of magnetic recordings of the synch pulses and said code pulse recording means records the code pulses with a partial overlap with said synch pulses.

12. The apparatus as claimed in claim 11 wherein the apparatus has a recording and reading head which is operatively disposed with respect to the synchronization track and an amplifier is employed to amplify signals sensed by the head, with a switch interposed between the amplifier and the recording head to enable in one switch mode a writing onto and in another switch mode a reading from the track;

said recording means including means responsive to detected synch pulses to operate said switch as to enable recording of code pulses during said intervals.

13. The apparatus as claimed in claim 12 wherein said switch operating means includes:

a first timing element operatively coupled to control the mode position of the switch; and a second timing element and a switchable voltage source, said voltage source being coupled to the timing element for control thereby and being coupled to the recording head so as to record code pulses representative of desired binary values in response to the detected synch pulses.

14. The apparatus according to claim 13 wherein the switchable voltage source includes a switch coupled between the magnetic head and a ground potential so as to connect the magnetic head alternatively to ground.

15. The apparatus as claimed in claim 10 and further including:

means for detecting the endings of the code pulses recorded on the video magnetic tape;

means for evaluating the binary values represented by time differences between the detected endings of code pulses and the start signals related to intervals during which associated endings of code pulses were detected.

16. The apparatus as claimed in claim 15 wherein the synch pulse detecting means detects the beginning of the magnetically recorded synch pulses and wherein said evaluating means includes:
   means for generating first and second binary signals representative of respective time differences between the beginning of synch pulses and the endings of code pulses.

17. The apparatus as claimed in claim 16 wherein said means for detecting synch pulses and means for detecting the code pulses each comprises a threshold detector.

18. The apparatus as claimed in claim 17 wherein said evaluating means includes:
   first pulse generated means responsive to one type of said detected pulses for producing a first time window pulse of predetermine duration; and
   means responsive to said first time window pulse for generating a first output signal depending upon whether the one type of detected pulse occurs during or after said time window pulse.

19. The apparatus as claimed in claim 18 wherein said evaluating means further includes:
   second pulse generator means responsive to the other type of detected pulses for producing a second time window pulse of predetermined duration that is longer than said first time window pulse; and
   means responsive to said second time window pulse for generating a second output signal depending upon whether the other type of detected pulse occurs during both first and second time window pulses.

20. The apparatus as claimed in claim 19 wherein said first and second pulse generating means each comprises a monoflop and wherein said first and second output signal generating means each comprises a flip-flop which is enabled by one of the monoflops and wherein each flip-flop is preset by said threshold detector, and
   logic means for polling of said flip-flops.

21. The apparatus as claimed in claim 20 wherein at least one of said monoflops has a control input coupled to said logic means to vary the duration of the time window pulse produced by the latter monoflop.

22. The apparatus as claimed in claim 15 wherein the evaluating means includes:
   means responsive to the coding pulses for generating time window pulses; and
   means responsive to the starting signals and the time window pulses to produce output signals representative of the binary values of the code pulses.

* * * * *